US006297500B1

(12) United States Patent
Franzen et al.

(10) Patent No.: US 6,297,500 B1
(45) Date of Patent: Oct. 2, 2001

(54) QUADRUPOLE RF ION TRAPS FOR MASS SPECTROMETERS

(75) Inventors: Jochen Franzen, Bremen; Arne Kasten, Karlsruhe, both of (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 09/196,707

(22) Filed: Nov. 20, 1998

(30) Foreign Application Priority Data

Nov. 20, 1997 (DE) .............................................. 197 51 401

(51) Int. Cl.[7] .............................. B01D 59/44; H01J 49/00

(52) U.S. Cl. .............................................. 250/292; 250/282

(58) Field of Search ..................................... 250/281, 292, 250/282

(56) References Cited

U.S. PATENT DOCUMENTS

| | | | |
|---|---|---|---|
| 2,939,952 | 6/1960 | Paul et al. . | |
| 5,170,054 | 12/1992 | Franzen . | |
| 5,349,196 * | 9/1994 | Amemiya et al. | 250/492.21 |
| 5,625,186 | 4/1997 | Frankevich et al. | 250/292 |
| 5,650,617 | 7/1997 | Mordehai | 250/290 |

FOREIGN PATENT DOCUMENTS

| | | |
|---|---|---|
| 4017264 | 12/1991 | (DE) . |
| 0113207 | 7/1984 | (EP) . |
| 0270232 A1 | 6/1988 | (EP) . |
| 0321819 | 6/1989 | (EP) . |
| 0383961 | 8/1990 | (EP) . |
| WO 98/05039 | 2/1988 | (WO) . |

OTHER PUBLICATIONS

March et al., Fundamentals of Ion Trap Mass Spectrometry, vol. I; Ion Trap Instrumentation, vol. II; Chemical Environmental, and Biomedical Applications, vol. III, Practical Aspects of Ion Trap Mass Spectrometry. (1995).

R. Alheit et al., Higher Order Non–Linear Resonances In A Paul Trap, International Journal of Mass Spectrometry and Ion Processes 154 (1996) 155–169.

Y. Wang et al., The Non–Linear Ion Trap. Part 3. Multipole Components In Three Types Of Practical Ion Trap, International Journal of Mass Spectrometry and Ion Processes 132 (1994) 155–172.

* cited by examiner

*Primary Examiner*—Bruce C. Anderson
(74) *Attorney, Agent, or Firm*—Kudirka & Jobse, LLP

(57) ABSTRACT

The invention relates to quadrupole RF ion traps used in a mass spectrometer, either as storage elements or as mass separators for the measurement of the mass spectrum of stored ions. The invention particularly relates to ion traps, which should show a pure quadrupole field without superimpositions of higher multipoles or, on the other hand, a quadrupole field with superimposition of one or several higher multipole fields of a precisely defined intensity, but no others, particularly no higher multipole fields.

The limitation of ring and end cap electrodes to finite dimensions induces components of higher multipole fields within the ion trap, which may cause negative influences on the storage and scanning behavior. The invention consists of strongly suppressing the formation of higher multipole fields other than those required, by reduction of the gap width between the electrodes in the marginal area, compared to the gap width of electrodes modeled exactly according to the equipotential surfaces of the required field mixture of infinite expansion. A particularly strong suppression of higher multipole fields can be achieved by a wave-shaped constriction in the marginal area between the electrodes.

18 Claims, 1 Drawing Sheet

QUADRUPOLE RF ION TRAPS FOR MASS SPECTROMETERS

The invention relates to quadrupole RF ion traps used in a mass spectrometer, either as storage elements or as mass separators for the measurement of the mass spectrum of stored ions. The invention particularly relates to ion traps, which should show a pure quadrupole field without superimpositions of higher multipoles or, on the other hand, a quadrupole field with superimposition of one or several higher multipole fields of a precisely defined intensity, but no others, particularly no higher multipole fields.

The truncation of ring and end cap electrodes to finite dimensions induces components of higher multipole fields within the ion trap, which may cause negative influences on the storage and scanning behavior. The invention consists of strongly suppressing the formation of higher multipole fields other than those required, by reduction of the gap width between the electrodes in the marginal area, compared to the gap width of electrodes modeled exactly according to the equipotential surfaces of the required field mixture of infinite expansion. A particularly strong suppression of higher multipole fields can be achieved by a wave-shaped constriction in the marginal area between the electrodes.

PRIOR ART

Theory and various applications of RF quadrupole ion traps as tandem mass spectrometers for MS/MS analyses, as reaction containers and measurement instruments for ion-molecule reactions, as tools for selective storage of ions with a uniform mass-to-charge ratio, or for the fragmentation of ions for analyses of their structure, are known from the standard book: “Practical Aspects of Ion Trap Mass Spectrometry”, Volumes I, II, and III edited by R. E. March and John F. J. Todd, CRC Press, Boca Raton, N.Y., London, Tokyo, 1995. The electrode form for the generation of an “ideal” quadrupole field was first described by Wolfgang Paul and Helmut Steinwedel in DE 944 900 and U.S. Pat No. 2,939,952. Accordingly, the ring and end cap electrodes within the ion trap must each have a rotationally symmetrical surface form with hyperbolic cross section, whereby the hyperbolas for the ring and end caps must belong to a hyperbola family with identical asymptotes, and the asymptotes have an angle of $\text{tang}(\alpha)=\sqrt{2}$ to the axial direction.

A pure quadrupole field without superimposition of higher multipole fields is however only then generated by this arrangement if the electrodes extend infinitely, which cannot be realized for practical reasons. Any truncation of the electrode form to finite dimensions, necessary for a finite size of the instrument, but also for reasons of finite electrical capacity of the electrode structure, involves a distortion of the quadrupole field which corresponds mathematically to a superimposition with weak multipole fields of a higher magnitude.

The superimposition of the RF quadrupole field with higher multipole fields has severe, sometimes even dramatically severe effects on the stored ions, even if the multipole fields are relatively weak. The effect of the higher multipole fields only becomes apparent outside the center of the trap, i.e., if the ions are not calmly located in the center of the quadrupole field. The oscillations of the stored ions are normally decelerated by a damping gas so that they collect in the center of the ion trap. However, the amplitude of their secular oscillations are temporarily found to reach into the non-central areas of the ion trap. The latter is the case (a) when the ions are introduced from the outside into the ion trap or are generated outside the center inside the ion trap; (b) when the ions are excited by additional electrical fields in their secular oscillation (for example during collisionally induced fragmentation of the ions); and (c) when the ions are ejected from the ion trap mass-selectively for analysis.

An experimental analysis (Alheit et al., “Higher order non-linear resonances in a Paul trap”, Int. J. Mass Spectrom. and Ion Proc. 154, (1996), 155–169) demonstrates impressively how specific ions from an actually ideal, though spatially limited ion trap are ejected almost immediately if they are not collected in the center by a damping gas, due to numerous nonlinear resonances, generated by extremely weak higher multipole fields, occurring in regular patterns of the Mathieu stability diagram. Nonlinear resonances result when the overtones of the ion oscillations, which arise due to nonlinear (inharmonic) retroactive forces, encounter the frequencies of the so-called Mathieu side bands. In this way it is possible for the affected ions to acquire energy from the storage field and thus quickly increase their oscillation amplitude (see the above cited standard work, Chapter 3, regarding nonlinear ion traps).

The effect of higher multipole fields, relative to the suitability of the ion trap as a mass spectrometer, can be advantageous, but also extremely disadvantageous. The higher multipole fields have the strongest influence on the various types of mass-selective ion ejection. They can dramatically improve or diminish the mass resolving power of the scan (using a so-called scan method) at the same scan speed. They can even delay or accelerate the ejection of individual ion types with specific dielectric characteristics, as compared to other ions of equal mass-to-charge ratios. The mechanism for these so-called mass shifts (see Chapter 4 of the above cited standard work) is not yet understood. However, a false mass-to-charge-ratio is simulated in this way, and the mass spectrometer loses its intended function as a measuring instrument for the mass-to-charge ratio of the ions.

The generation of quadrupole fields with a required superimposition of specific multipole fields of even ordinal numbers, which are especially favorable for the method of “mass-selective in stability scans” according to EP 0 113 207, is known from EP 0 321 819 and is based upon a particular shape of electrode. Random superimposition with weak hexapole and octopole fields is possible without higher multipole fields, such as are required for the “nonlinear resonance ejection” scan method according to EP 0 383 961, is described in DE 40 17 264 and is also based upon a particular shape of the electrodes.

DISADVANTAGES OF PREVIOUS METHODS

The electrode surfaces for a pure quadrupole field according to DE 944 900 and those for superimposition with pure octopole and hexapole fields according to DE 40 17 264 are shaped respectively as finite sections of computed equipotential surfaces of the required fields, whereby the basis for the computation is that the equipotential surfaces extend infinitely. However, as already mentioned above, truncation of the electrodes to a practical size already involves an undesirable superimposition with higher multipole fields, which has in many cases a detrimental effect upon the scan method being used.

At the same time, multipole fields of measurable strength up to very high orders appear with alternating signs, i.e. the higher fields are partially added to, partially subtracted from the quadrupole field. In this way, the retroactive pseudoforces, responsible for the secular oscillations of the ions, no longer increase simply linearly with the distance from the center, but rather have a very complicated characteristic. As a consequence of this, a complicated and no longer manageable dependency of the secular oscillation frequency on the oscillation amplitude results, which finally determines the resolution of the ion-ejecting scan method.

Using simple mathematical simulation methods in computers, it is basically possible to optimize the octopole and hexapole fields for various scan methods. These simulations, however, roughly no longer agree with experimental results if higher multipole fields arise in weak, though influential, dimensions due to limitation of the electrodes. Exact simulation with fields using truncated electrodes is very difficult.

However, not only the mathematical simulations are impaired, but also many partially undesirable effects appear in the ion traps. These also affect—in addition to the above mentioned disadvantages—the capability of uniform storage of ions during ionization in particular, or the storing of daughter ions during fragmentation.

In general any type of combination of quadrupole and higher multipole fields can be generated in an ion trap by computing the ideal equipotential surfaces of the field mixture and exactly reproducing the shape of these equipotential surfaces by metallically conducting electrodes.

However, it is also necessary to pursue the electrodes for quite a distance toward infinity, to avoid the otherwise inevitable marginal disturbances.

The real equipotential surfaces within a truncated ion trap diverge considerably from the ideal ones before reaching the electrode margins. They concentrate near to the surface of the electrode edges (see FIG. 2) and thin out in the center between the electrodes. In the space beyond the margins, they diverge extremely from one another and fill the geometrically available space outside the metallically conductive structures. The distribution of equipotential lines in the gap at the margin of the electrodes is thus considerably different from the distribution that they would have with unlimited continuation of the electrode form (FIG. 1). The result is a superimposition of the ion trap field with weak higher multipole fields. The exact form of the divergence furthermore depends on the geometric potential distribution outside the ion trap, which again refers back to the geometric construction of the mechanical holder and the environment of the electrodes.

OBJECTIVE OF THE INVENTION

It is the objective of the invention to find a form of electrodes for a finitely large quadrupole RF ion trap, which provides the required pure quadrupole field or the required superimposition of a quadrupole field with specific higher multipole fields of a defined intensity with the least possible superimposition of other multipole fields of higher order.

BRIEF DESCRIPTION OF THE INVENTION

It is the basic idea of the invention to reduce this influence from the limitation of the electrodes by slighting constricting the bundle of equipotential surfaces at the margin of the electrodes by narrowing the gap width between the electrodes, principally to avoid a premature divergence. Within the gap the constricted bundle of equipotential surfaces widens toward the center of the ion trap somewhat divergently again, and thus assumes approximately the form and distribution that it would have with infinitely extended electrodes.

The correction is not precise, though it can suppress the formation of undesirable higher multipole fields within the ion trap by more than one order of magnitude. A slight hypercorrection here can particularly minimize the formation and influence of negatively superimposed multipole fields of the even orders 6–10 (dodecapole to icosipole). Higher multipoles with odd orders of magnitude do not occur as long as the ion trap is designed symmetrical to the ring mid level, though production tolerances play an extremely important role here.

An especially good correction can be achieved by a wave-shaped constriction tapering toward the inside of the ion trap.

PARTICULARLY FAVORABLE EMBODIMENTS

Figure 1:
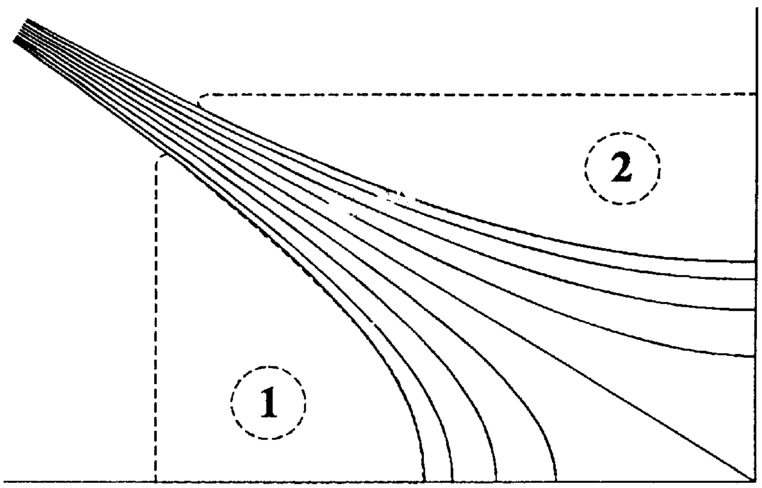
FIG. 1 shows a cross-section through the ideal equipotential surfaces of a quarter of an ion trap. These "ideal" equipotential surfaces are computed for infinite expansion. Virtually truncated ring (1) and end cap electrodes (2) are shown with a broken line.

The purpose of the invention is to prevent the formation of any other than the required mixture of multipole fields within the ion trap. Superimposition of a quadrupole field with hexapole and octopole fields, sometimes even of still higher multipole fields, may certainly also be desirable, as is already apparent from the initially cited patents.

The hexapole field has a nonlinear resonance of extreme intensity for the oscillations of ions in an axial direction of the ion trap at exactly one third the frequency of the applied RF voltage. This nonlinear resonance can be used excellently for a very fast, mass-precise ejection of ions. The increase with time of the oscillation amplitude of the ions in an axial direction follows a hyperbolic function in the vicinity of a mathematical pole of the function. That leads to rapid ejection of ions and thus to an excellent mass resolving power, even with very fast scan methods. Fast scan methods means more spectra from more samples per unit of time, forming an important factor in the profitability of the mass spectrometer. Fast scan methods are however also important in keeping pace with a constantly improved separation power of upstream chromatographic or electrophoretic separation methods for substance mixtures.

On the other hand, the octopole field has a damping effect on any type of resonant ejection, because it generates a relatively strong shift of the oscillation frequency of an ion with an increase in its oscillation amplitude. Thus the ion falls out of resonance as soon as its oscillation amplitude rises. This damping of resonance works for all resonant disturbances, for example for ripple disturbances on the quadrupole RF, for dipolar excitations through excitation frequencies across the end cap electrodes and for all types of nonlinear resonances. An octopole field, not too weak, even chokes off the effect of its own nonlinear resonance in an axial direction of the ion trap at a quarter of the quadrupole RF. In this way, the octopole field is extraordinarily beneficial for the good and safe storage of ions.

The hexapole field also generates a shift in the oscillation frequency with increasing amplitude, but only of the second order. This shift is directed against the octopole field shift and counter-balances this, although only weakly. With a combination of a relatively strong hexapole field with a weaker octopole field, an excellent scan method according to the method of nonlinear ion ejection thus results. Since however the effect of all nonlinear resonances disappears at the center of the ion trap, the ions have to be push-started by dipolar excitation of the ion oscillations using an alternating current between the end caps, as described in DE 689 13 290.

The generation of a relatively strong hexapole field is already possible using extraordinarily minimal form changes of the electrodes. The electrode forms for the superimposition with pure octopole and hexapole fields are described in DE 40 17 264, whereby this patent describes the electrode surfaces by such equipotential surfaces, which are provided by an infinite expansion of the field. With a truncation of the electrodes to a practically producible and usable form, the above described problems with the generation of other higher multipole fields thus occur.

The ions need not absolutely be ejected by a nonlinear resonance of the hexapole field. Through nonlinear resonances of higher uneven multipole fields, higher mass ranges can be used at the same maximum RF voltage. As described in DE 43 16 738, a superimposition of the quadrupolar RF field with another quadrupolar alternating field of a lower frequency can also be used advantageously to eject the ions. This quadrupolar alternating field can be generated solely using electrical media; no form change to the electrodes is necessary for this. Here the hexapole field can be completely ignored, although an octopole field is also favorable in this place, although unnecessary.

How can the generation of higher multipole fields with a limitation of the electrodes be avoided?

Figure 2:
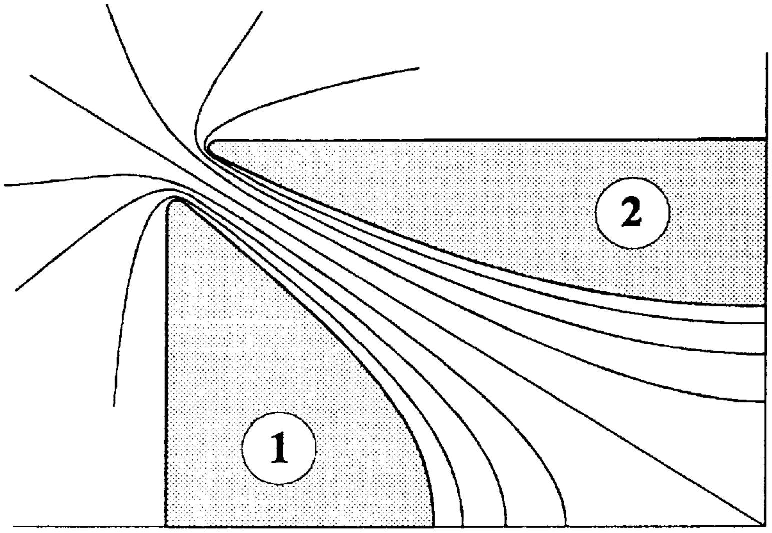
FIG. 2 shows a cross-section though a quarter of an ion trap with truncated ring and end cap electrodes (without an external holding structure), the shapes of which are modeled as a section of the ideal equipotential surfaces. The "real" equipotential surfaces visibly diverge in the gap area, compared to their "ideal" counterparts according to FIG. 1. Outside the ion trap, they uniformly fill the entire available space. No limiting metal surfaces are drawn in here outside this idealized ion trap, such as would be the case in real ion traps.

As outlined above, the multipole fields are generated by marginal disturbances of the field. The bundle of equipotential surfaces already diverges within the gap range between the electrodes, as seen in FIG. 2, in contrast to the bundle of ideal equipotential surfaces of an infinitely extended arrangement according to FIG. 1.

Normally, the electrodes at the edges of the limitation are not angularly shaped, but instead are rounded off. This rounding off of electrode edges is necessary to prevent electrical discharges in the intensified field from angular edges (peak discharges). The risk of discharges is increased even further by the presence of damping gases with pressures between $10^{-2}$ to $10^{-4}$ hectopascal. However, these rounded edges intensify the marginal effect on the equipotential surfaces.

The divergence of the equipotential surfaces can be at least partially counteracted by a constriction of the gap area in a relatively simple manner.

Quite favorable for preventing higher multipole fields is a simple constriction of the gap by two respectively opposing, rounded protrusions at the edge of the electrodes in the direct marginal area. The bundle of equipotential surfaces is compressed here between the protrusions in the area of the outlet from the ion trap. Here, the compression is stronger directly at the surface of the protrusions than at the center between the protrusions. The bundle of equipotential surfaces then widens again toward the center of the ion trap again, whereby especially the bundle parts severely narrowed in the direct surface area of the projections are relieved. In this way, the equipotential surfaces are distributed within the ion trap more similar to an ideal, infinitely extended arrangement than with a simple, protrusionless truncation of the electrodes.

Optimal conditions are created with constrictions through two respective rounded, opposing projections, the thickness of which together equals about 15% of the gap width. Optimal constriction is however dependent on many parameters and can vary within a range of about 5% to 40%. The projections can, for example, have a hemispherical profile, although a somewhat flatter design is more favorable. The optimal shape of the projections is especially dependent on the shape of the equipotential surfaces in the area outside the ion trap.

It may be favorable to have projections of asymmetrical thickness. It is an especially disturbing effect if the remaining higher multipole fields of the orders 4–10 (or even higher) have negative signs, such as occur with unconstricted gaps. With thicker protrusions on the ring electrode and thinner ones on the end caps, this tendency can be counteracted in such a way that the remainder of the higher multipoles receive positive signs.

Figure 3:
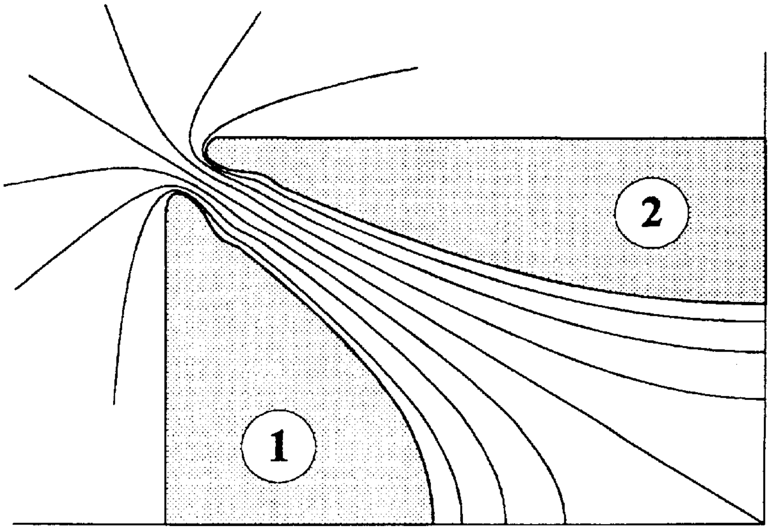
FIG. 3 shows how "ideal" equipotential surfaces inside the trap can be approximated by a protruding constrictions with a wave-like taper inside the ion trap again towards an ideally shaped electrode form in the trap center, so that superimposition of the field within the ion trap with higher multipole fields remains very minimal. Due to the deformation of the margin, the influence of the external holding structure on the inner field is also greatly reduced.

Even better than simple projections is, however, an electrode edge in the form of a wave tapering toward the inside of the ion trap. Here, the outer protrusion first transforms into a slight depression, which only then becomes rounded off into the ideal form of infinitely expansive equipotential surfaces, as shown in FIG. 3. The wavelength here should be in the order of magnitude of the gap width. This wave shape in the marginal area can (particularly with narrow gap widths) also be continued over several continuously weakening wave cycles toward the inside; this corresponds precisely to the reciprocal process of an apodization of the light beam at the margins of an optical gap for preventing the wave-shaped margins of the diffraction images. At the inside end of the waveband there is then a distribution of equipotential surfaces beyond the gap, which corresponds in density and direction to a very good approximation of an infinitely expanded field distribution. In this way, the effect of the marginal disturbance within the ion trap is practically disabled.

The wave can be simulated in a simpler embodiment through a medium profile of constriction. This results in a continuous constriction toward the margin. A particularly simple embodiment of this type of constriction is when the hyperbolic profile of the electrode surfaces toward the gap margin very simply turns into an straight form. This form can be reproduced in manufacturing with very good production tolerances and also easily tested, whereas the reproducible manufacturing of a wave-shaped gap termination requires highly skilled workmanship and high mechanical precision.

The manufacturing tolerances for the inner surface of an ion trap must be a maximum of about 3 micrometers for a trap with a ring diameter of about 2 centimeters, if ion traps with reproducible operation must be achieved.

Optimization of the electrode forms is not simple, since the optimal form is dependent upon the external design of the ion trap, even from the dielectrics present outside the trap. Using the above given basic principles however, the experienced specialist will succeed in extensively suppressing the occurrence of higher multipoles, even without special calculations, but by feel, so to speak.

In the outer space, each of the end cap electrodes usually becomes flange-shaped, which forces the equipotential surfaces more strongly toward the ring electrode. This tendency may be countered by an asymmetrically shaped wave. On the ring electrode, a protrusion of about +9% of the gap width, a wave trough of −3% of the gap width, and a terminating protrusion of +1% of the gap width may be formed. On the end cap, the corresponding dimensions then should be +6%, −2% and +0.6%.

For more precise work, it may be necessary to calculate the potential distribution very precisely within the ion trap using an optimization program and compare this with the ideal distribution. For this comparison, it is sufficient to compare the ideal and real potential characteristic within the rotation axis (usually called the z axis), since this potential characteristic alone describes and defines all potential distributions in the vicinity. Such a program for potential calculation may be based, for example, on the method of finite elements.

Experimental optimization of forms is difficult, particularly since there are no simple measurement parameters to ensure success.

What is claimed is:

1. RF ion trap for a mass spectrometer, comprising a rotationally symmetrical ring electrode and two rotationally symmetrical end cap electrodes with inner electrode surfaces modeled along the infinitely expanded, ideal equipotential surfaces of a mathematically correct ion trap field, the majority of the inner surfaces following said ideal equipotential surfaces, but deviating from said ideal equipotential surfaces so as to form a gap between the ring and end cap electrodes in the regions of closest proximity between the ring electrode and the respective end cap electrodes that is narrower than a corresponding gap width between the ideal equipotential surfaces.

2. RF ion trap according to claim 1 wherein said ideal equipotential surfaces are according to a mathematical model of a quadrupole field on which is superimposed a hexapole and/or an octopole field.

3. RF ion trap according to claim 1, wherein the gap between the ring and end cap electrodes, relative to the ideal equipotential surfaces, is narrower by an amount that corresponds to about 5% to 40% of the gap width between the ideal surfaces.

4. RF ion trap according to claim 3, wherein the gap between the ring and end cap electrodes corresponds to about 15% of the gap width between the ideal surfaces.

5. RF ion trap according to claim 1, wherein the gap between the ring and end cap electrodes, relative to the ideal equipotential surfaces, is narrowed asymmetrically.

6. RF ion trap according to claim 1, wherein a respective cross section of each of the ring and/or end cap electrodes is mostly hyperbolic in shape but with straight regions in the gaps towards the edges of the electrodes.

7. RF ion trap according to claim 1, wherein the narrower portion of the gap between the ring electrode and the respective end cap electrodes, relative to the ideal equipotential surfaces, has the form of two respective opposing, rounded-off protrusions at the edges of the electrodes.

8. RF ion trap according to claim 1, wherein a cross-sectional geometry of the inner surfaces of each electrode, in comparison to the ideal profile of the equipotential surfaces, appears as an inward protrusion that transitions into slight, rounded-off depressions, so that the electrode surfaces in an area of the electrode edge assume the form of a slight wave.

9. RF ion trap according to claim 8, wherein the protrusions toward the inside of the ion trap appear as a weakening wave form with several cycles.

10. RF ion trap according to claim 9, wherein the wave shapes create a variation on the ring electrode, in comparison to the ideal profile of the equipotential surfaces, of +9%, −3%, and +1% of an adjacent gap width, and while a similar variation on the end cap electrodes is +6%, −2%, and +0.6% of the adjacent gap width.

11. RF ion trap according to claim 10, wherein said ideal equipotential surfaces are according to a mathematical model of a quadrupole field on which is superimposed a hexapole and/or an octopole field.

12. RF ion trap according to claim 1 wherein said ideal equipotential surfaces are according to a mathematical model of a quadrupole field.

13. A method of making an RF ion trap for a mass spectrometer, wherein the ion trap has a rotationally symmetric ring electrode and two rotationally symmetric end cap electrodes, the method comprising:

determining a mathematical model of infinite equipotential surfaces for an ion trap that would produce an ideal ion trap field;

determining differences in an ion trap field relative to said ideal ion trap field that result from a limiting of equipotential surfaces in an ion trap to predetermined finite dimensions; and producing said ring electrode and said end cap electrodes with respective inner surfaces that, when assembled in the ion trap, are geometrically similar to the ideal equipotential surfaces, but that deviate from the ideal equipotential surfaces in a manner that counteracts said differences in a field resulting from the finite dimensions of the surfaces.

14. A method according to claim 13 wherein said ideal equipotential surfaces are according to a mathematical model of a quadrupole field.

15. A method according to claim 13 wherein said ideal equipotential surfaces are according to a mathematical model of a quadrupole field on which is superimposed a hexapole and/or an octopole field.

16. A method according to claim 13 wherein said inner surfaces deviate from said ideal equipotential surfaces so as to form a gap between the ring and end cap electrodes in the regions of closest proximity between the ring electrode and the respective end cap electrodes that is narrower than the corresponding gap between the ideal equipotential surfaces.

17. A method according to claim 13, wherein a gap between the ring and end cap electrodes, relative to the ideal equipotential surfaces, is narrowed asymmetrically.

18. A method according to claim 13, wherein a cross-sectional geometry of the inner surfaces of each electrode, in comparison to the ideal profile of the equipotential surfaces, appears as an inward protrusion that transitions into slight, rounded-off depressions, so that the electrode surfaces in an area of the electrode edge assume the form of a slight wave.

* * * * *